US010336258B2

(12) United States Patent
Kaino et al.

(10) Patent No.: US 10,336,258 B2
(45) Date of Patent: Jul. 2, 2019

(54) ELECTRONIC MIRROR CONTROL DEVICE

(71) Applicant: MAZDA MOTOR CORPORATION, Hiroshima (JP)

(72) Inventors: Akira Kaino, Hiroshima (JP); Yoshitaka Fujihara, Hiroshima (JP); Yoko Hoshino, Hiroshima (JP); Makoto Yoshida, Hiroshima (JP); Kumiko Takenouchi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/760,764

(22) PCT Filed: Mar. 14, 2017

(86) PCT No.: PCT/JP2017/010061
§ 371 (c)(1),
(2) Date: Mar. 16, 2018

(87) PCT Pub. No.: WO2017/169705
PCT Pub. Date: Oct. 5, 2017

(65) Prior Publication Data
US 2018/0257570 A1    Sep. 13, 2018

(30) Foreign Application Priority Data
Mar. 30, 2016    (JP) .................................. 2016-067459

(51) Int. Cl.
*B60R 1/00*    (2006.01)
*B60R 1/12*    (2006.01)
(Continued)

(52) U.S. Cl.
CPC .................. *B60R 1/12* (2013.01); *B60R 1/00* (2013.01); *B60R 1/006* (2013.01);
(Continued)

(58) Field of Classification Search
None
See application file for complete search history.

(56) References Cited

U.S. PATENT DOCUMENTS

2017/0253186 A1*    9/2017   Nakai ...................... B60R 1/00
2017/0297496 A1*    10/2017  Onaka ................. H04N 5/23293

FOREIGN PATENT DOCUMENTS

JP      2011-170568 A    9/2011
JP      2012-170127 A    9/2012
(Continued)

*Primary Examiner* — Ashok Patel
(74) *Attorney, Agent, or Firm* — Studebaker & Brackett PC

(57) ABSTRACT

An electronic mirror control device includes: an imager which captures a rearward image including a rear side surface of the vehicle; a display which displays the rearward image; a calculator which calculates a position of a vanishing point; an extractor which extracts a rear side surface region where the rear side surface of the vehicle is displayed; and a display controller which displays a lower region of the rearward image with brightness higher than brightness of a region other than the lower region, the lower region being surrounded by an outer rim of the display, a first straight line taking the vanishing point as a point of origin, passing through the rear side surface region, and extending below a horizon, and a second straight line taking the vanishing point as a point of origin, and extending below the horizon on a side opposite to the first straight line.

4 Claims, 9 Drawing Sheets

(51) Int. Cl.
  *G08G 1/16* (2006.01)
  *H04N 7/18* (2006.01)
  *B60R 11/02* (2006.01)

(52) U.S. Cl.
  CPC ............ *B60R 11/0229* (2013.01); *G08G 1/16* (2013.01); *H04N 7/18* (2013.01); *H04N 7/181* (2013.01); *B60R 2001/1253* (2013.01); *B60R 2300/303* (2013.01); *B60R 2300/305* (2013.01); *B60R 2300/307* (2013.01); *B60R 2300/8066* (2013.01)

(56) References Cited

FOREIGN PATENT DOCUMENTS

| | | |
|---|---|---|
| JP | 2013-183298 A | 9/2013 |
| JP | 2013-187562 A | 9/2013 |
| JP | 2014-116756 A | 6/2014 |
| JP | 2015-177371 A | 10/2015 |

\* cited by examiner

ELECTRONIC MIRROR CONTROL DEVICE

TECHNICAL FIELD

The technique disclosed herein relates to an electronic mirror control device for controlling display of a rearward image including a rear side surface of a vehicle, the rearward image being captured by an imager.

BACKGROUND ART

Conventionally, there is proposed a device that displays, on a display installed inside a vehicle, an image of a rear side surface and a rear side of the vehicle captured by an in-vehicle camera (see Patent Literature 1). According to the technique described in Patent Literature 1, the visibility of a driver is improved by displaying the image on the display while partially compressing the image.

CITATION LIST

Patent Literature

Patent Literature 1: JP 2012-170127 A

SUMMARY OF INVENTION

During traveling, a driver needs to accurately and safely grasp a traveling space in any environment. In a case where there is no indirect vision in a side-view mirror allowing viewing of a rear side of the vehicle or on a display for displaying the rear side of the vehicle captured by a camera, the driver turns the driver's body or head to look at the rear side. In this case, the driver can intuitively grasp the position, in the traveling environment, of the rear side environment the driver is looking at. However, because the head is turned or the gaze is moved, the time when the driver looks aside becomes long.

On the other hand, in the case of using an indirect vision in a side-view mirror or on a display, the rear side of the vehicle can be checked without turning the body or the head, and thus the time when the driver looks aside is reduced. However, because the traveling environment is not directly looked at, grasping of the traveling environment from the indirect vision takes time.

Accordingly, even in the case of using the indirect vision, the traveling environment, such as a positional relationship of the own vehicle, is desired to be grasped in a short time from the indirect vision. However, Patent Literature 1 described above does not give enough consideration to this point.

The technique disclosed herein has its object to enable a traveling environment to be grasped in a short time from an indirect vision.

To solve the problem described above, an aspect of the technique disclosed herein includes: an imager which is installed on a vehicle, and captures a rearward image including a rear side surface of the vehicle during traveling; a display which displays the rearward image captured by the imager; a calculator which calculates a position of a vanishing point from the rearward image; an extractor which extracts, in the rearward image, a rear side surface region where the rear side surface of the vehicle is displayed; and a display controller which displays a lower region of the rearward image with brightness higher than brightness of a region other than the lower region, the lower region being surrounded by a first straight line, a second straight line, and an outer rim of the display, the first straight line taking the vanishing point as a point of origin, passing through the rear side surface region, and extending below a horizon, the second straight line taking the vanishing point as a point of origin, and extending below the horizon on a side opposite to the first straight line with respect to a vertical line passing through the vanishing point.

According to this electronic mirror control device, the lower region, of the rearward image, surrounded by the first straight line, the second straight line, and the outer rim of the display is displayed with brightness higher than brightness of the region other than the lower region, the first straight line taking the vanishing point as the point of origin, passing through the rear side surface region, and extending below the horizon, the second straight line taking the vanishing point as the point of origin and extending below the horizon on the side opposite to the first straight line with respect to the vertical line passing through the vanishing point. Hence, a driver can grasp the traveling environment in a short time based on an indirect vision displayed on the display.

DESCRIPTION OF EMBODIMENTS

Figure 1:
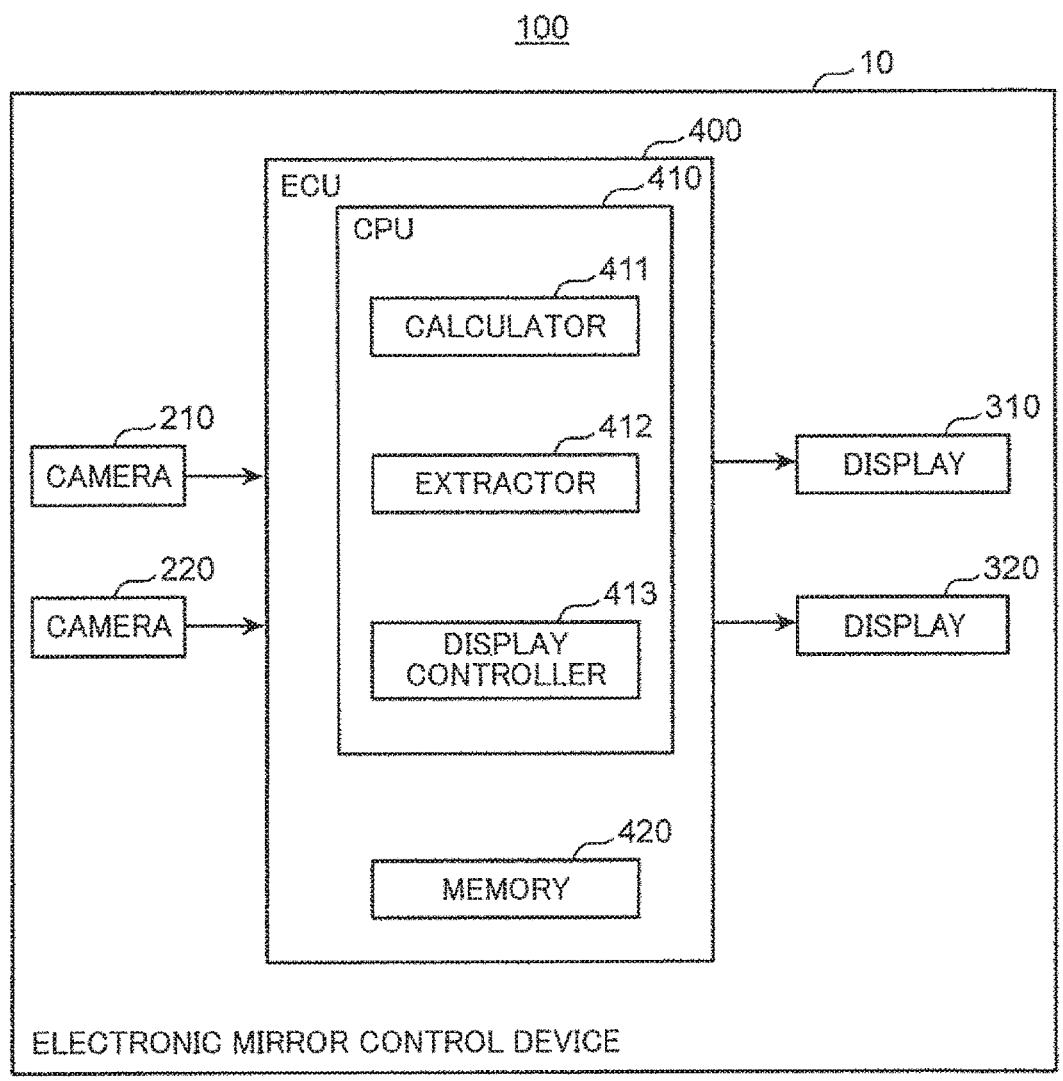
FIG. 1 is a block diagram schematically showing a configuration of a vehicle according to an embodiment.

Hereinafter, an embodiment of the present disclosure will be described with reference to the drawings. The same reference numerals are assigned to the same elements in the drawings, and a repeated description is omitted as appropriate.

FIG. 1 is a block diagram schematically showing a configuration of a vehicle according to the present embodiment. A vehicle 100 is a four-wheeled vehicle, for example. As shown in FIG. 1, the vehicle 100 includes an electronic mirror control device 10. The electronic mirror control device 10 has cameras 210, 220 (examples of the imager), displays 310, 320 (examples of the display), and an electronic control unit (ECU) 400.

For example, the camera 210 is attached to a right side-view mirror of the vehicle 100, with an optical axis of the camera 210 extending towards the rear side of the vehicle 100. The camera 210 successively captures, every predetermined period of time (1/60 seconds for instance), a rearward image of the right rear side of the vehicle 100 including a rear side surface on the right side of the vehicle 100. The camera 210 may be attached to a position where the right side-view mirror was to be attached, with the optical axis of the camera 210 extending towards the rear side of the vehicle 100, instead of being attached to the right side-view mirror.

For example, the camera 220 is attached to a left side-view mirror of the vehicle 100, with the optical axis of the camera 220 extending towards the rear side of the vehicle 100. The camera 220 successively captures, every predetermined period of time (1/60 seconds for instance), a rearward image of the left rear side of the vehicle 100 including a rear side surface on the left side of the vehicle 100. The camera 220 may be attached to a position where the left side-view mirror was to be attached, with the optical axis of the camera 220 extending towards the rear side of the vehicle 100, instead of being attached to the left side-view mirror.

The display 310 is disposed in front of the driver's seat, slightly on the right side. The display 310 displays the latest rearward image among the rearward images of the right rear side of the vehicle 100 successively captured by the camera 210 every predetermined period of time (1/60 seconds for instance). The display 320 is disposed in front of the driver's seat, slightly on the left side. The display 320 displays the latest rearward image among the rearward images of the left rear side of the vehicle 100 successively captured by the camera 220 every predetermined period of time (1/60 seconds for instance).

The display 310, 320 has a rectangular shape. For example, the display 310, 320 includes a liquid crystal display panel. The display 310, 320 may include another display device such as an organic electro luminescence (EL) panel, without being limited to the liquid crystal display panel.

The ECU 400 controls the operation of the entire vehicle 100. The ECU 400 includes a central processing unit (CPU) 410, a memory 420, and other peripheral circuits. For example, the memory 420 is configured by a semiconductor memory such as a flash memory, a hard disk, or another storage element. The memory 420 includes a frame memory for temporarily storing each rearward image captured by the cameras 210, 220, a memory for storing programs, a memory for temporarily storing data, and the like. The memory 420 may alternatively be configured by a single memory including a region for temporarily storing each rearward image captured by the cameras 210, 220, a region for storing programs, and a region for temporarily storing data.

The CPU 410 functions as a calculator 411, an extractor 412, and a display controller 413, by operating according to programs stored in the memory 420. The calculator 411 calculates the position of a vanishing point on each display 310, 320 from each rearward image captured by each camera 210, 220.

The extractor 412 extracts, from the rearward image captured by the camera 210, a rear side surface region 502 (FIG. 3) where the rear side surface on the right side of the vehicle 100 is displayed. The extractor 412 extracts, from the rearward image captured by the camera 220, a rear side surface region where the rear side surface on the left side of the vehicle 100 is displayed.

The display controller 413 displays, on the respective displays 310, 320, the latest rearward images captured by the respective cameras 210, 220 and stored in respective frame memories in the memory 420. When displaying the rearward images captured by the cameras 210, 220 on the displays 310, 320, the display controller 413 displays the images in a horizontally reversed manner In this manner, an image reflected in the right side-view mirror is displayed on the display 310, and an image reflected in the left side-view mirror is displayed on the display 320. Functions of the calculator 411, the extractor 412, and the display controller 413 will be described later in detail.

Figure 2:
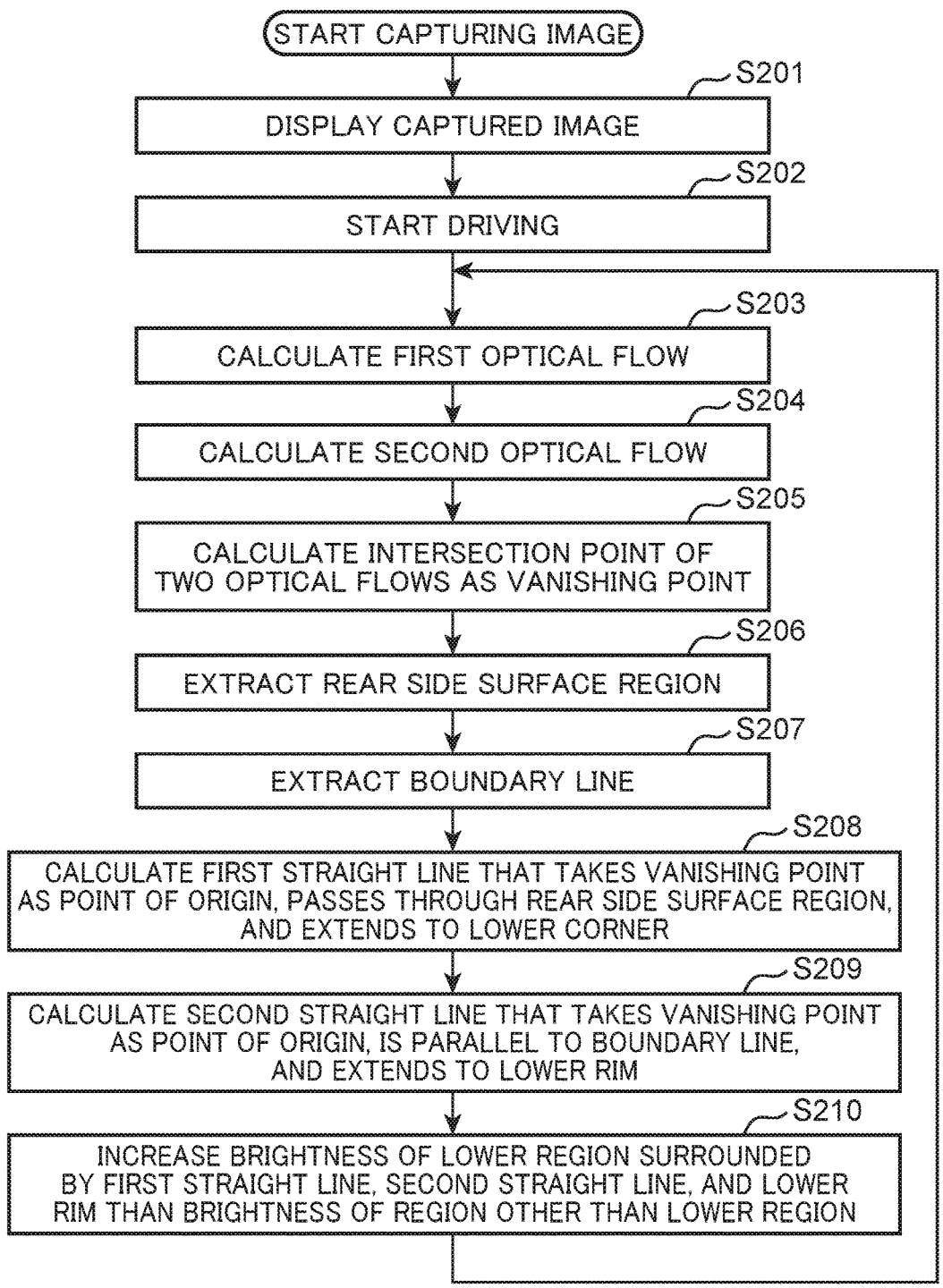
FIG. 2 is a flowchart schematically showing an example of an operation of the vehicle.
Figure 3:
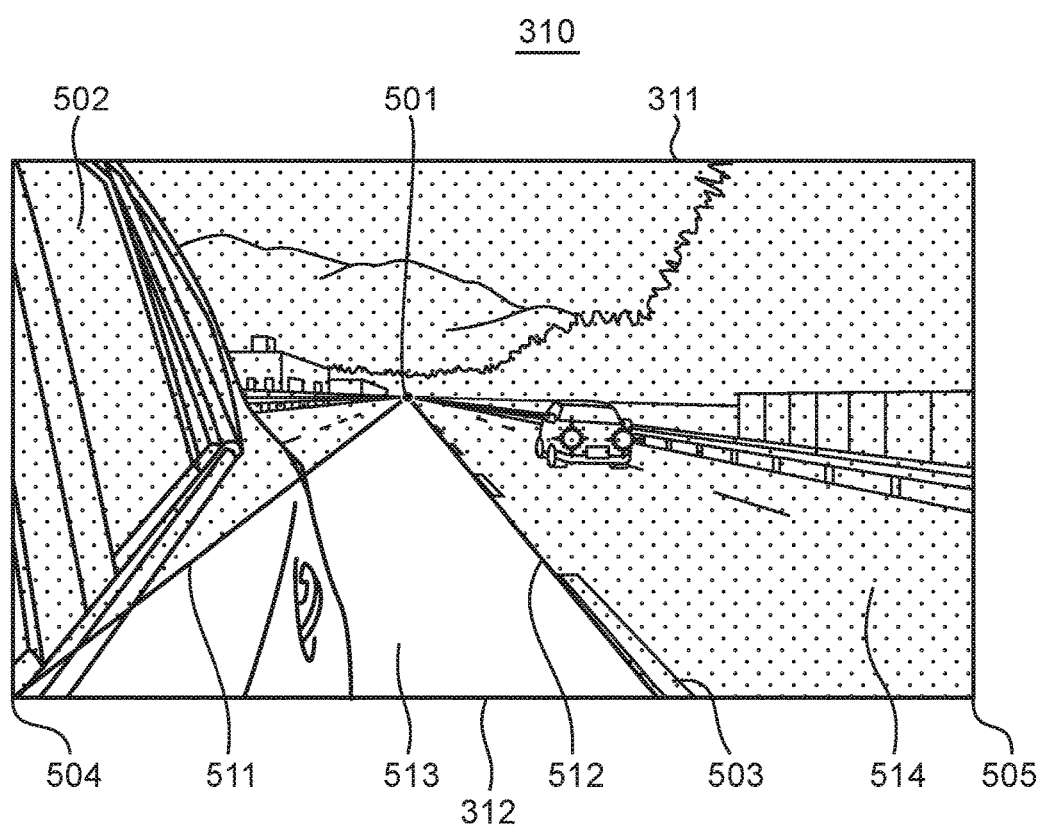
FIG. 3 is a diagram showing a rearward image which is displayed on a display by the operation in FIG. 2.

FIG. 2 is a flowchart schematically showing an example of an operation of the vehicle 100. FIG. 3 is a diagram showing a rearward image 311 which is displayed on the display 310 by the operation in FIG. 2. In the following, a description will be given of the rearward image captured by the camera 210, but the same can be applied to the rearward image captured by the camera 220.

For example, when the engine is started, capturing image by the camera 210 is started, and the operation in FIG. 2 is started. In step S201, the display controller 413 displays, on the display 310, the latest rearward image captured by the camera 210 and stored in the frame memory of the memory 420.

Next, in step S202, the vehicle 100 starts driving. Then, the calculator 411 calculates, in step S203, a first optical flow from the rearward image captured by the camera 210, and calculates, in step S204, a second optical flow different from the first optical flow.

An optical flow expresses the motion of an object in an image by a vector. The calculator 411 may extract corresponding feature points from a plurality of rearward images, and may calculate a line connecting the extracted corresponding feature points as the first or second optical flow. The calculator 411 may calculate the first and second optical flows using a known method such as Lucas-Kanade method, or Horn-Schunk method.

Next, in step S205, the calculator 411 calculates an intersection point of the first optical flow and the second optical flow as a vanishing point 501 (FIG. 3). The vanishing point means a point where lines which are in reality parallel to each other intersect each other when the lines are drawn as non-parallel lines in perspective.

Next, in step S206, the extractor 412 extracts, on the display 310, the rear side surface region 502 where the rear side surface of the vehicle 100 is displayed. The extractor 412 may extract the rear side surface region 502 by a template matching method. Alternatively, the extractor 412 may compare respective pixel values of a plurality of rearward images captured by the camera 210 every predetermined period of time, and may extract a region where there is no change in the pixel values as the rear side surface region 502.

The ECU 400 may include a camera controller for changing the angle of the optical axis of the camera 210 according to an operation of the driver, so that a capturing range of the camera 210 can be changed. The memory 420 may store data associating the angle of the optical axis of the camera 210 with the rear side surface region 502. In such a case, the extractor 412 may acquire the current angle of the optical axis of the camera 210 from the camera controller, and may extract the rear side surface region 502 which is associated with the acquired angle of the optical axis from the memory 420.

Next, in step S207, the extractor 412 extracts a boundary line 503 indicating a boundary between lanes drawn on a road. The extractor 412 may compare brightness of respective pixels in a region other than the rear side surface region 502 extracted in step S206, and may extract, as the boundary line 503, a long and narrow rectangular image which extends obliquely from a lower rim 312 of the display 310 and which has relatively high brightness.

Next, in step S208, the display controller 413 calculates a first straight line 511 which takes the vanishing point 501 as a point of origin, which passes through the rear side surface region 502, and which extends to a lower corner 504 (an example of the first corner) of the display 310. Then, in step S209, the display controller 413 calculates a second straight line 512 which takes the vanishing point 501 as a point of origin, which is parallel to the boundary line 503, and which extends to the lower rim 312 of the display 310. Each of the first straight line 511 and the second straight line 512 passes through the vanishing point 501, and hence, represents an optical flow.

Next, in step S210, the display controller 413 increases brightness of a lower region 513, of the rearward image 311, surrounded by the first straight line 511, the second straight line 512, and the lower rim 312 (an example of the outer rim) of the display 310, compared to brightness of a region 514 other than the lower region 513. Specifically, the display controller 413 may multiply a brightness value of each pixel in the lower region 513 by a factor K1 (where K1 is a number greater than 1). Additionally, in the case where the multiplication result exceeds an upper limit value (for example, 255 in the case of 8 bits), the display controller 413 may take the upper limit value as the brightness value. Alternatively, the display controller 413 may multiply a brightness value of each pixel in the region 514 other than the lower region 513 by a factor K2 (where K2 is a positive number less than 1).

Then, the process returns to step S203, and the steps described above are repeated. The operation in FIG. 2 may end when the vehicle 100 is brought to a stop.

As described above, according to the present embodiment, the display controller 413 increases the brightness of the lower region 513, of the rearward image 311, surrounded by the first straight line 511, the second straight line 512, and the lower rim 312 of the display 310, compared to the brightness of the region 514 other than the lower region 513. Due to the difference in the brightness, a driver can visually check, in the rearward image 311, the first straight line 511 and the second straight line 512 representing the optical flows. Accordingly, the driver can visually check the first straight line 511 representing the optical flow, in the rear side surface region 502 where no optical flow exists. As a result, the driver can grasp the traveling environment, such as the position of the driver's vehicle, in a short time based on an indirect vision displayed on the display 310.

Moreover, the second straight line 512 is parallel to the boundary line 503. Generally, the boundary line 503 in the rearward image 311 passes through a vicinity of the vanishing point 501. Accordingly, the second straight line 512 and the boundary line 503 are approximately coincident with each other. Therefore, the second straight line 512 representing the optical flow may be made to stand out even more.

Furthermore, in the case where the sky is bright, in the rearward image 311 displayed on the display 310, the lower region 513, where the road is displayed in many cases, is generally made dark due to an automatic exposure function of the camera 210. However, according to the present embodiment, the brightness of the lower region 513 is increased compared to the brightness of the region 514 other than the lower region 513, and thus the road can be made bright. As a result, the road becomes easily visible.

Figure 4:
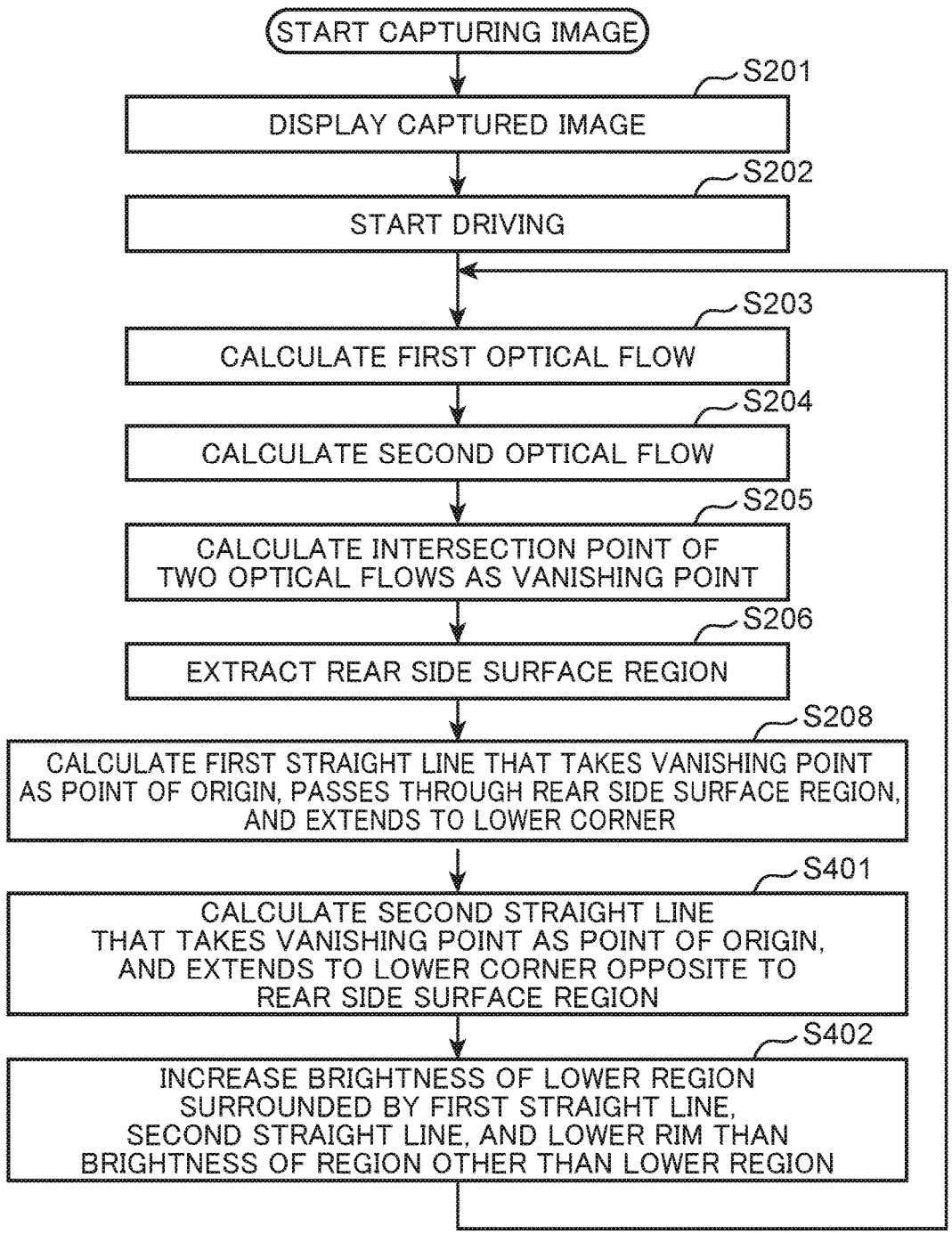
FIG. 4 is a flowchart schematically showing a different example of the operation of the vehicle.
Figure 5:
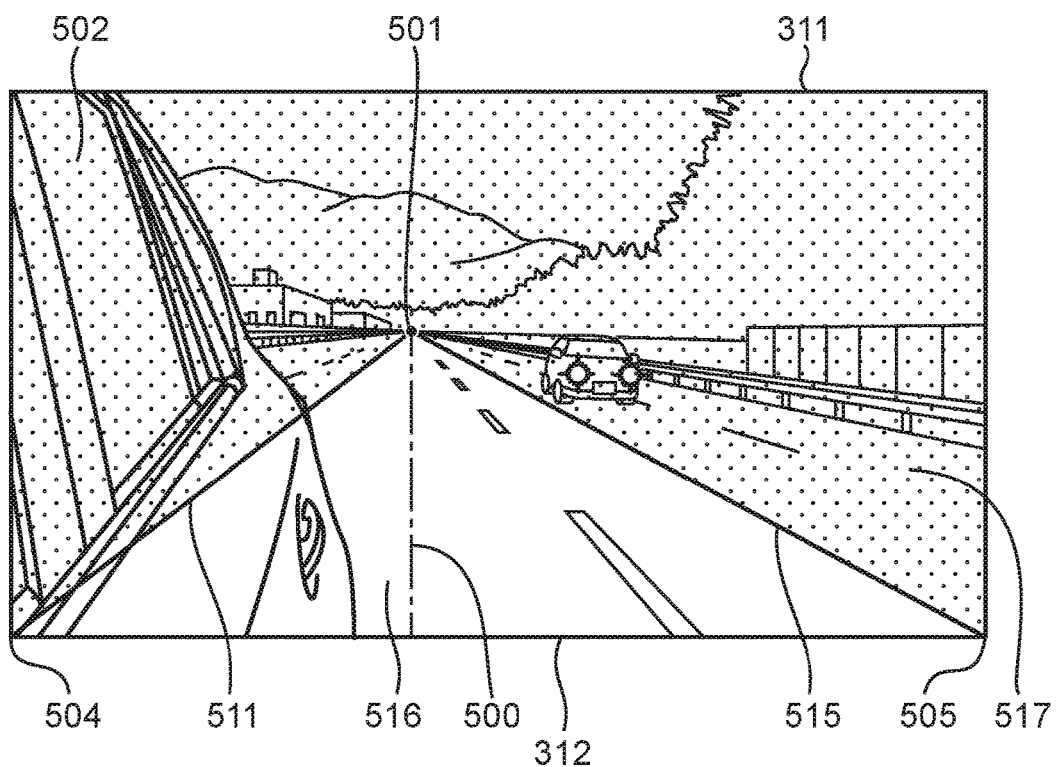
FIG. 5 is a diagram showing the rearward image which is displayed on the display by the operation in FIG. 4.

FIG. 4 is a flowchart schematically showing a different example of the operation of the vehicle 100. FIG. 5 is a diagram showing the rearward image 311 which is displayed on the display 310 by the operation in FIG. 4. Steps S201 to S206 and S208 in FIG. 4 are the same as steps S201 to S206 and S208 in FIG. 2.

In step S401 following step S208, the display controller 413 calculates a second straight line 515 which takes the vanishing point 501 as a point of origin, and which extends to a lower corner 505 (an example of the second corner) of the display 310, the lower corner 505 being on the side opposite to the rear side surface region 502.

Next, in step S402, the display controller 413 increases brightness of a lower region 516, of the rearward image 311, surrounded by the first straight line 511, the second straight line 515, and the lower rim 312 of the display 310, compared to brightness of a region 517 other than the lower region 516. Specifically, the display controller 413 may take a multiplication result obtained by multiplying a brightness value of each pixel in the lower region 516 by a factor K3 (where K3 is a number greater than 1) as the brightness value of each pixel. Additionally, in the case where the multiplication result exceeds an upper limit value (for example, 255 in the case of 8 bits), the display controller 413 may take the upper limit value as the brightness value. Alternatively, the display controller 413 may take a multiplication result obtained by multiplying a brightness value of each pixel in the region 517 other than the lower region 516 by a factor K4 (where K4 is a positive number less than 1) as the brightness value of each pixel.

Then, the process returns to step S203, and the steps described above are repeated. The operation in FIG. 4 may end when the vehicle 100 is brought to a stop.

In the embodiment shown in FIGS. 4 and 5, the display controller 413 increases the brightness of the lower region 516, of the rearward image 311, surrounded by the first straight line 511, the second straight line 515, and the lower rim 312 of the display 310, compared to the brightness of the region 517 other than the lower region 516. Due to the difference in brightness, a driver can visually check, in the rearward image 311, the first straight line 511 and the second straight line 515 representing optical flows. Accordingly, as in the embodiment described above, the driver can grasp the traveling environment, such as the position of the driver's vehicle, in a short time based on an indirect vision displayed on the display 310.

Furthermore, because the brightness of the lower region 516 is increased compared to the brightness of the region 517 other than the lower region 516, the road can be made bright. As a result, the road becomes easily visible, as in the embodiment described above.

Figure 6:
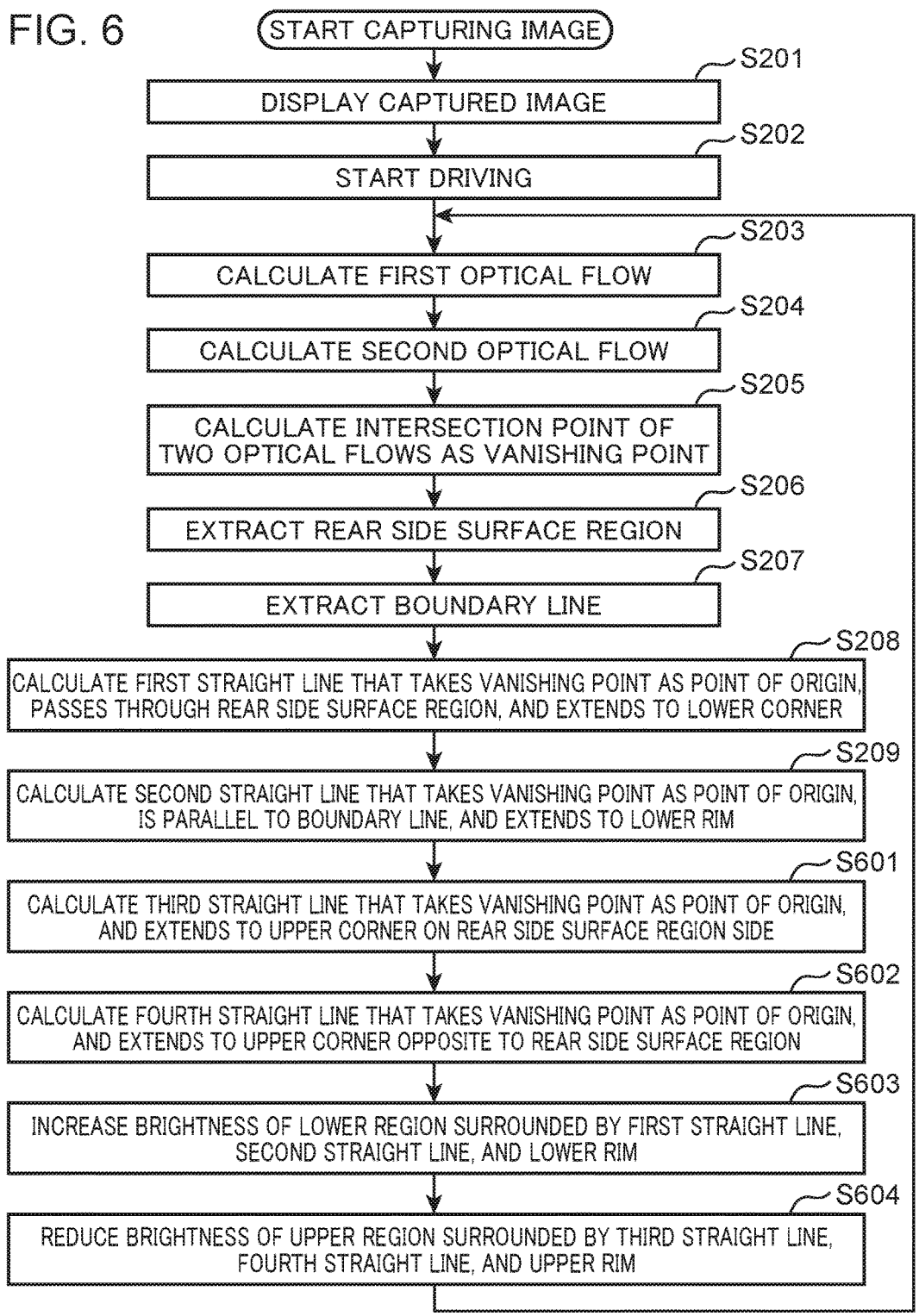
FIG. 6 is a flowchart schematically showing a further different example of the operation of the vehicle.
Figure 7:
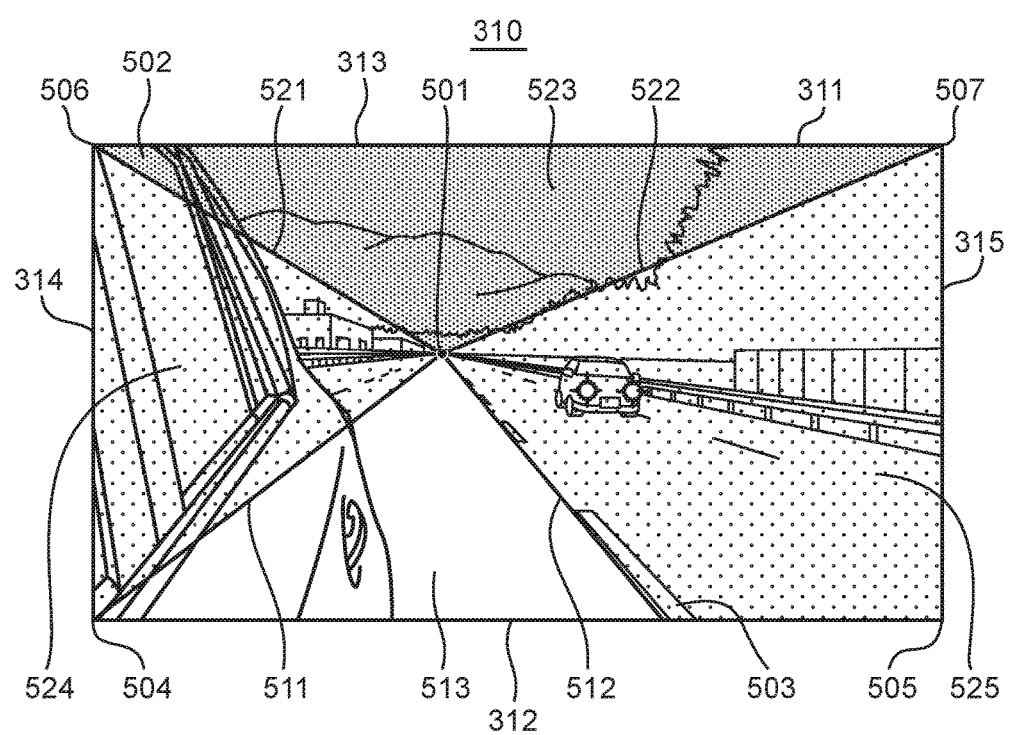
FIG. 7 is a diagram showing the rearward image which is displayed on the display by the operation in FIG. 6.

FIG. 6 is a flowchart schematically showing a further different example of the operation of the vehicle 100. FIG. 7 is a diagram showing the rearward image 311 which is displayed on the display 310 by the operation in FIG. 6. Steps S201 to S209 in FIG. 6 are the same as steps S201 to S209 in FIG. 2.

In step S601 following step S209, the display controller 413 calculates a third straight line 521 which takes the vanishing point 501 as a point of origin, and which extends to an upper corner 506 (an example of the third corner) of the display 310, the upper corner 506 being on the side of the rear side surface region 502.

In the following step S602, the display controller 413 calculates a fourth straight line 522 which takes the vanishing point 501 as a point of origin, and which extends to an upper corner 507 (an example of the fourth corner) of the display 310, the upper corner 507 being on the side opposite to the rear side surface region 502. Similarly to the first straight line 511 and the second straight line 512, the third straight line 521 and the fourth straight line 522 pass through the vanishing point 501, and thus represent optical flows.

In step S603, the display controller 413 increases brightness of the lower region 513, of the rearward image 311, surrounded by the first straight line 511, the second straight line 512, and the lower rim 312 of the display 310. Specifically, the display controller 413 may take a multiplication result obtained by multiplying the brightness value of each pixel in the lower region 513 by a factor K5 (where K5 is a number greater than 1) as the brightness value of each pixel. Additionally, in the case where the multiplication result exceeds an upper limit value (for example, 255 in the case of 8 bits), the display controller 413 may take the upper limit value as the brightness value.

In step S604, the display controller 413 reduces brightness of an upper region 523, of the rearward image 311, surrounded by the third straight line 521, the fourth straight line 522, and an upper rim 313 of the display 310. Specifically, the display controller 413 may take a multiplication result obtained by multiplying a brightness value of each pixel in the upper region 523 by a factor K6 (where K6 is a positive number less than 1) as the brightness value of each pixel. Then, the process returns to step S203, and the steps described above are repeated. The operation in FIG. 6 may end when the vehicle 100 is brought to a stop.

Due to steps S603, S604, brightness of a left region 524 surrounded by the first straight line 511, the third straight line 521, and a left rim 314 of the display 310, and brightness of a right region 525 surrounded by the second straight line 512, the fourth straight line 522, and a right rim 315 of the display 310 become lower than the brightness of the lower region 513 and higher than the brightness of the upper region 523. That is, in the rearward image 311, the brightness of the lower region 513 is made the highest, and the brightness of the upper region 523 is made the lowest.

In the embodiment shown in FIGS. 6 and 7, the display controller 413 increases the brightness of the lower region 513, of the rearward image 311, surrounded by the first straight line 511, the second straight line 512, and the lower rim 312 of the display 310, and reduces the brightness of the upper region 523, of the rearward image 311, surrounded by the third straight line 521, the fourth straight line 522, and the upper rim 313 of the display 310. Due to the difference in brightness, a driver can visually check, in the rearward image 311, the third straight line 521 and the fourth straight line 522 representing optical flows, in addition to the first straight line 511 and the second straight line 512 representing optical flows. As a result, the driver can grasp the traveling environment, such as the position of the driver's vehicle, in a short time based on an indirect vision displayed on the display 310.

Moreover, because the brightness of the lower region 513 is made the highest and the brightness of the upper region 523 is made the lowest, the road can be made more easily visible.

Figure 8:
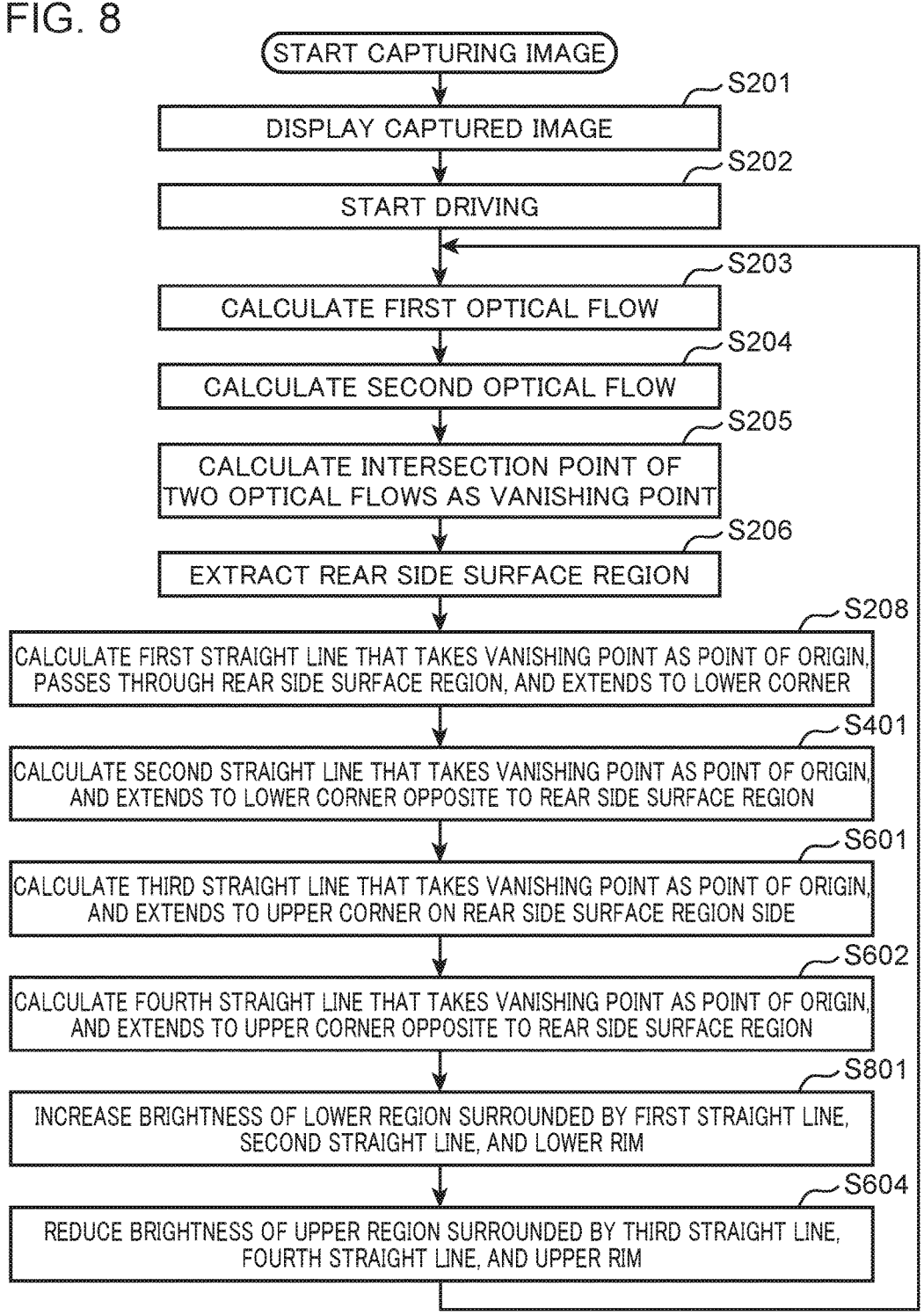
FIG. 8 is a flowchart schematically showing a further different example of the operation of the vehicle.
Figure 9:
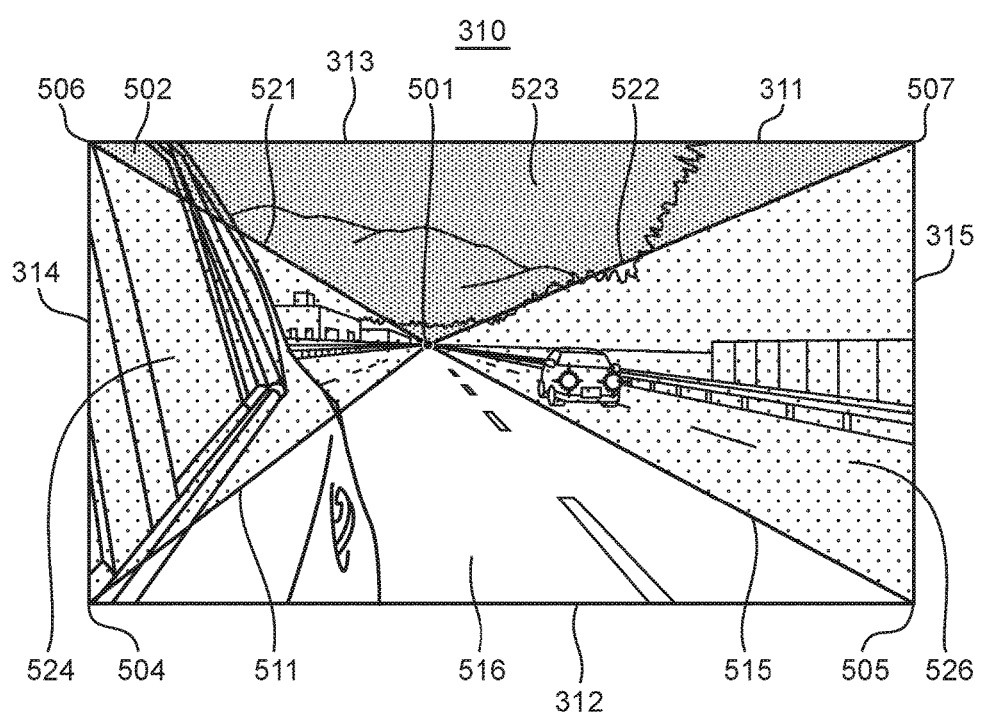
FIG. 9 is a diagram showing the rearward image which is displayed on the display by the operation in FIG. 8.

FIG. 8 is a flowchart schematically showing a further different example of the operation of the vehicle 100. FIG. 9 is a diagram showing the rearward image 311 which is displayed on the display 310 by the operation in FIG. 8.

Steps S201 to S206 and S208 in FIG. 8 are the same as steps S201 to S206 and S208 in FIG. 2. Step S401 in FIG. 8 is the same as step S401 in FIG. 4. Steps S601, S602 in FIG. 8 are the same as steps S601, S602 in FIG. 6.

In step S801 following step S602, the display controller 413 increases brightness of the lower region 516, of the rearward image 311, surrounded by the first straight line 511, the second straight line 515, and the lower rim 312 of the display 310. The display controller 413 may take a multiplication result obtained by multiplying the brightness value of each pixel in the lower region 516 by a factor K7 (where K7 is a number greater than 1) as the brightness value of each pixel. The following step S604 is the same as step S604 in FIG. 6. Then, the process returns to step S203, and the steps described above are repeated. The operation in FIG. 8 may end when the vehicle 100 is brought to a stop.

Due to steps S801, S604, the brightness of the left region 524 surrounded by the first straight line 511, the third straight line 521, and the left rim 314 of the display 310, and the brightness of a right region 526 surrounded by the second straight line 515, the fourth straight line 522, and the right rim 315 of the display 310 become lower than the brightness of the lower region 516 and higher than the brightness of the upper region 523. That is, in the rearward image 311, the brightness of the lower region 516 is made the highest, and the brightness of the upper region 523 is made the lowest.

In the embodiment shown in FIGS. 8 and 9, the display controller 413 increases the brightness of the lower region 516, of the rearward image 311, surrounded by the first straight line 511, the second straight line 515, and the lower rim 312 of the display 310, and reduces the brightness of the upper region 523, of the rearward image 311, surrounded by the third straight line 521, the fourth straight line 522, and the upper rim 313 of the display 310. Due to the difference in brightness, a driver can visually check, in the rearward image 311, the third straight line 521 and the fourth straight line 522 representing optical flows, in addition to the first straight line 511 and the second straight line 515 representing optical flows. As a result, the driver can grasp the traveling environment, such as the position of the driver's vehicle, in a short time based on an indirect vision displayed on the display 310.

Moreover, because the brightness of the lower region 516 is made the highest and the brightness of the upper region 523 is made the lowest, the road can be made more easily visible.

In FIGS. 3, 5, 7, and 9 described above, the first straight line 511 extends to the lower corner 504 of the display 310, but this is not restrictive. The first straight line 511 may extend to the lower rim 312 or the left rim 314 other than the corner 504. In other words, it is only required that the first straight line 511 takes the vanishing point 501 as the point of origin, passes through the rear side surface region 502, and extends below the horizon. However, it is preferable that the first straight line 511 extends to the lower corner 504 of the display 310 because the first straight line 511 becomes the longest and thus the first straight line 511 is more easily visible to the driver.

Moreover, in FIGS. 5 and 9 described above, the second straight line 515 extends to the lower corner 505 of the display 310, but this is not restrictive. The second straight line 515 may extend to the lower rim 312 or the right rim 315 other than the corner 505. In other words, it is only required that the second straight line 515 takes the vanishing point 501 as the point of origin, and extends below the horizon on the side opposite to the first straight line 511 with respect to a vertical line 500 (FIG. 5) passing through the vanishing point 501. However, it is preferable that the second straight line 515 extends to the lower corner 505 of the display 310 because the second straight line 515 becomes the longest and thus the second straight line 515 is more easily visible to the driver.

In each embodiment described above, the calculator 411 calculates the intersection point of the optical flows as the vanishing point 501, but the method for calculating the position of the vanishing point 501 is not limited to such a method. Alternatively, the calculator 411 may detect, from one rearward image 311, two straight lines among lines such as a straight line indicating an edge of a road, such as a shoulder of the road or a central reservation, and the boundary line 503 indicating the boundary between lanes, for example, and may calculate the intersection point of the detected two straight lines as the vanishing point.

The specific embodiments described above mainly include the invention having the following configurations.

An aspect of the technique disclosed herein includes: an imager which is installed on a vehicle, and captures a rearward image including a rear side surface of the vehicle during traveling; a display which displays the rearward image captured by the imager; a calculator which calculates a position of a vanishing point from the rearward image; an extractor which extracts, in the rearward image, a rear side surface region where the rear side surface of the vehicle is displayed; and a display controller which displays a lower region of the rearward image with brightness higher than brightness of a region other than the lower region, the lower region being surrounded by a first straight line, a second straight line, and an outer rim of the display, the first straight line taking the vanishing point as a point of origin, passing through the rear side surface region, and extending below a horizon, the second straight line taking the vanishing point as a point of origin, and extending below the horizon on a side opposite to the first straight line with respect to a vertical line passing through the vanishing point.

According to this aspect, the lower region, of the rearward image, surrounded by the first straight line which takes the vanishing point as the point of origin, which passes through the rear side surface region, and which extends below the horizon, the second straight line which takes the vanishing point as the point of origin and which extends below the horizon on the side opposite to the first straight line with respect to the vertical line passing through the vanishing point, and the outer rim of the display is displayed with brightness higher than brightness of the region other than the lower region.

Each of the first straight line and the second straight line takes the vanishing point as the point of origin, and is thus a straight line representing an optical flow. The lower region of the rearward image is displayed with brightness higher than brightness of the region other than the lower region. Hence, a driver can visually check the first straight line and the second straight line representing optical flows, due to the difference in brightness. Consequently, the driver can visually check the first straight line representing the optical flow in the rear side surface region where no optical flow exists. As a result, the driver can grasp the traveling environment in a short time based on an indirect vision displayed on the display. Moreover, because the lower region of the rearward image is displayed with brightness higher than brightness of the region other than the lower region, the road can be made easily visible.

In the aspect described above, for example, the imager may capture a boundary line, which is drawn on a road, which indicates a boundary between lanes, the extractor may extract the boundary line from the rearward image, and the display controller may calculate the second straight line as a straight line which extends in parallel to the boundary line extracted by the extractor.

In this aspect, the second straight line is calculated as the straight line which extends in parallel to the boundary line indicating the boundary between lanes drawn on a road. Generally, a boundary line in the rearward image passes through a vicinity of the vanishing point, and thus, the second straight line and the boundary line are approximately coincident with each other. Accordingly, the second straight line representing an optical flow can be made easily visible.

In the aspect described above, for example, the display may have a rectangular shape, and the display controller may calculate the first straight line as a straight line which extends to a lower first corner on a side of the rear side surface region of the display, and may calculate the second straight line as a straight line which extends to a lower second corner opposite to the first corner of the display.

In this aspect, the first straight line is calculated as the straight line which extends to the lower first corner on the side of the rear side surface region of the display, and the second straight line is calculated as the straight line which extends to the lower second corner opposite to the first corner of the display. Accordingly, the first straight line and the second straight line representing optical flows can be made the longest within a limited display range of the display. The first straight line and the second straight line representing the optical flows can thus be made easily visible.

In the aspect described above, for example, the display may have a rectangular shape, and the display controller may display an upper region of the rearward image with brightness lower than brightness of a region other than the upper region, the upper region being surrounded by a third straight line, a fourth straight line, and an upper rim of the display, the third straight line taking the vanishing point as a point of origin and extending to an upper third corner on a side of the rear side surface region of the display, the fourth straight line taking the vanishing point as a point of origin and extending to an upper fourth corner opposite to the third corner of the display.

In this aspect, the upper region, of the rearward image, surrounded by the third straight line which takes the vanishing point as the point of origin and which extends to the upper third corner on the side of the rear side surface region of the display, the fourth straight line which takes the vanishing point as the point of origin and which extends to the upper fourth corner opposite to the third corner of the display, and the upper rim of the display is displayed with brightness lower than brightness of the region other than the upper region.

Each of the third straight line and the fourth straight line takes the vanishing point as the point of origin, and is thus a straight line representing an optical flow. The upper region of the rearward image is displayed with brightness lower than brightness of the region other than the upper region. Thus, a driver can visually check the third straight line and the fourth straight line representing the optical flows in addition to the first straight line and the second straight line, due to the difference in brightness. As a result, the driver can grasp the traveling environment in a short time based on an indirect vision displayed on the display. Moreover, because the upper region, of the rearward image, where the sky or the scenery is captured in many cases is displayed with brightness lower than brightness of the region other than the upper region, the road can be made easily visible.

The invention claimed is:

1. An electronic mirror control device comprising:
   an imager which is installed on a vehicle, and captures a rearward image including a rear side surface of the vehicle during traveling;
   a display which displays the rearward image captured by the imager;
   a calculator which calculates a position of a vanishing point from the rearward image;
   an extractor which extracts, in the rearward image, a rear side surface region where the rear side surface of the vehicle is displayed; and a display controller which displays a lower region of the rearward image with brightness higher than brightness of a region other than the lower region, the lower region being surrounded by a first straight line, a second straight line, and an outer rim of the display, the first straight line taking the vanishing point as a point of origin, passing through the rear side surface region, and extending below a horizon, the second straight line taking the vanishing point as a point of origin, and extending below the horizon on a side opposite to the first straight line with respect to a vertical line passing through the vanishing point.

2. The electronic mirror control device according to claim 1, wherein
the imager captures a boundary line, which is drawn on a road, which indicates a boundary between lanes,
the extractor extracts the boundary line from the rearward image, and
the display controller calculates the second straight line as a straight line which extends in parallel to the boundary line extracted by the extractor.

3. The electronic mirror control device according to claim 1, wherein
the display has a rectangular shape, and
the display controller calculates the first straight line as a straight line which extends to a lower first corner on a side of the rear side surface region of the display, and calculates the second straight line as a straight line which extends to a lower second corner opposite to the first corner of the display.

4. The electronic mirror control device according to claim 2, wherein
the display has a rectangular shape, and
the display controller displays an upper region of the rearward image with brightness lower than brightness of a region other than the upper region, the upper region being surrounded by a third straight line, a fourth straight line, and an upper rim of the display, the third straight line taking the vanishing point as a point of origin and extending to an upper third corner on a side of the rear side surface region of the display, the fourth straight line taking the vanishing point as a point of origin and extending to an upper fourth corner opposite to the third corner of the display.

* * * * *